Sept. 10, 1929.   H. MEHSERLE   1,727,376
SPIT
Filed July 5, 1928
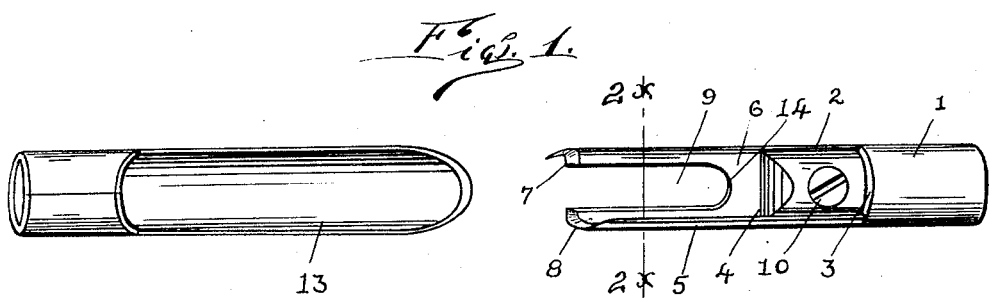
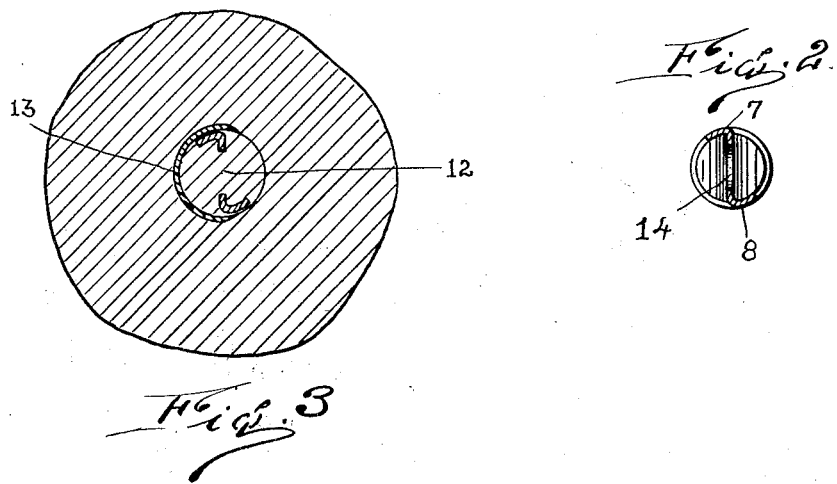
Inventor
Henry Mehserle
By Frank Keiper, Attorney Patented Sept. 10, 1929.

1,727,376

UNITED STATES PATENT OFFICE.

HENRY MEHSERLE, OF ROCHESTER, NEW YORK, ASSIGNOR TO KATIE MEHSERLE, OF ROCHESTER, NEW YORK.

SPIT.

Application filed July 5, 1928. Serial No. 290,369.

The object of this invention is to provide a new and improved form of spit for holding apples during the paring and coring operation, and for the ejecting the core after the apple is removed. This and other objects of the invention will be illustrated in the drawings, described in the specification and pointed out in the claims at the end thereof.

In the drawings:

Figure 1 is the side elevation of the coring spoon and spit shown in line with each other.

Figure 2 is a vertical cross section through the spit, the section being taken on the line 2×, 2× of Figure 1.

Figure 3 is a vertical section through an apple with both the coring spoon and the spit shown in engagement therewith.

In the drawings like reference numerals indicate like parts.

In an apple paring and coring machine as heretofore made, the apples are carried on a spit that is usually in the form of a fork having two or three prongs or tines. The spit when provided with three tines usually has them arranged at the corners of a triangle. It has been found however, that such spits do not hold the apple firmly enough, and I have improved on such spits by inventing the spit shown in my prior application 220,034 filed in the Patent Office September 7, 1927. I have made further improvement on the spit of my prior application, which will now be described.

I have found that prior spits do not work well in apples with soft cores and in order to overcome the objection to such spits and make them hold the apple firmly when the core of the apple is soft, I have invented the spit of this application in which reference numeral 1 indicates the base which is preferably threaded on the inside to provide for attaching it to the paring machine. This base has a reduced extension 2 which forms a shoulder 3 therewith. This reduced extension has a slot 4 therein in which engages the spit 5. The spit 5 is made preferably of sheet steel and has a short central web 6 with two angular shaped tines 7 and 8 extending forwardly therefrom having a recess 9 between them. On the forward edge of the tines 7 and 8 the tines are sharpened to a cutting edge so that they will easily penetrate the apple as shown in cross section in Figure 3. The web is held in the reduced ends of the base by means of the screw 10 which passes through the inner end of the spit. The reduced end of the base is countersunk to receive the head of the screw.

It will be seen that the spit of this case cuts two small angular shaped grooves one on each side of the core, and leaves the central part of the core intact as indicated at 12. This makes the core stronger at that point so that the apple will not turn on the spit during the paring and coring operation. The spit is so shaped that it will rotate inside of the coring spoon 13 when the coring spoon is in position to core the apple as shown in Figure 3. The knife in the spit is sharpened at the end of the recess indicated at 14 and the reduced end of the base is beveled on each side of the spit so that when the core is pushed along the spit by the next apple, the spit and the base will cut the core in half and split the core thereby getting it out of the machine.

I claim:

1. A spit for an apple paring and coring machine having a web with flanges thereon on the long sides thereof, said web and flanges being sharpened to an edge on the exposed end thereof, the web being cut away centrally thereof from the exposed end backward toward the rear end of the spit.

2. A spit for an apple paring and coring machine having a web with flanges thereon on the long side thereof, said web and flanges being sharpened to an edge on the exposed end thereof, the web being cut away centrally thereof from the exposed end backward toward the rear end of the spit, a base at the other end of the spit on which it is mounted, said base being tapered where it joins the spit to cause the core to split as it is pushed along the spit.

3. A spit for an apple paring and coring machine having a web with flanges thereon on the long side thereof, said web and flanges being sharpened to an edge on the exposed end thereof, the web being cut away centrally thereof from the exposed end backward toward the rear end of the spit, said flanges being curved concentrically to the center of rotation of the spit.

In testimony whereof I affix my signature.

HENRY MEHSERLE.